UNITED STATES PATENT OFFICE.

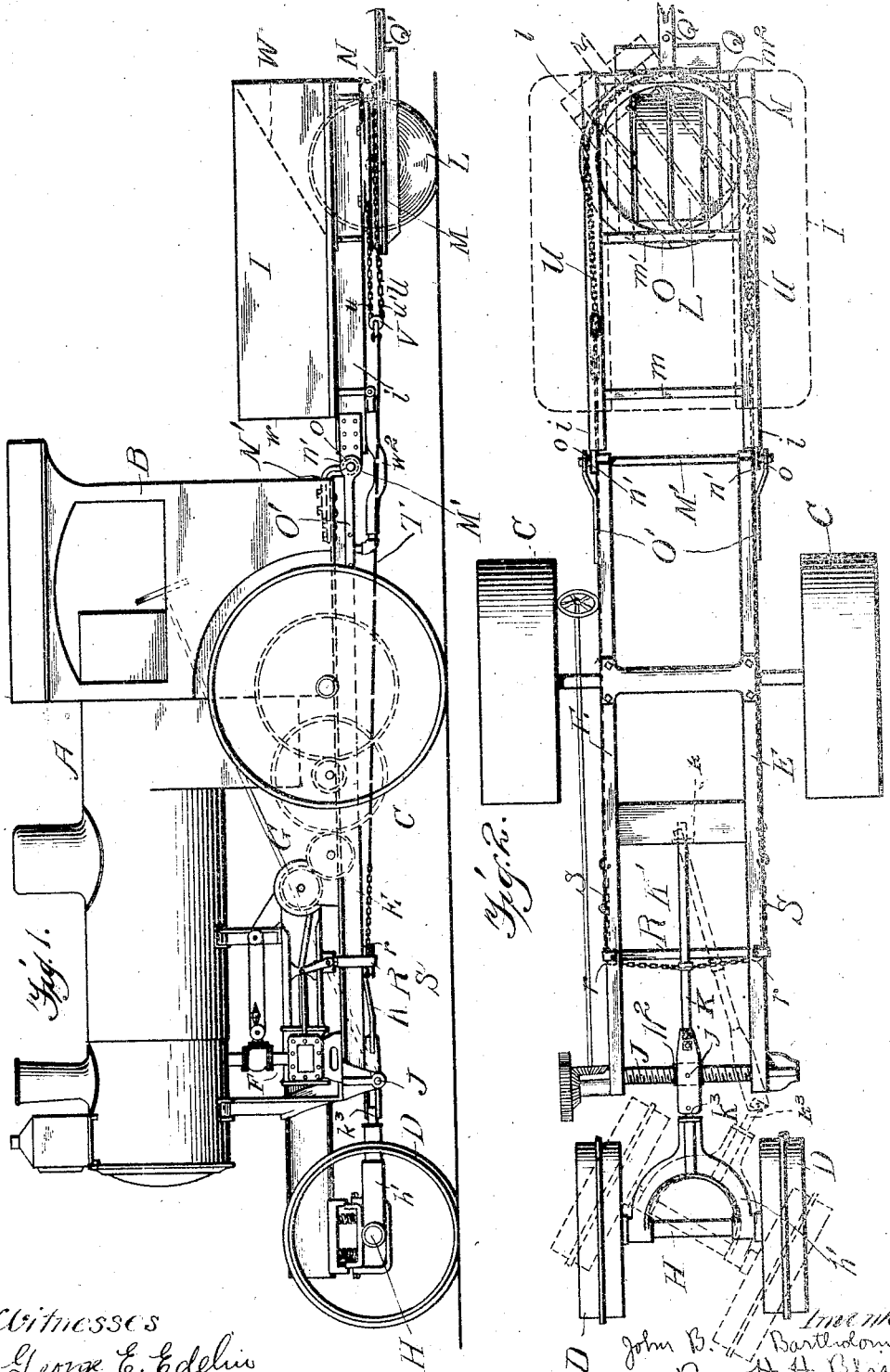

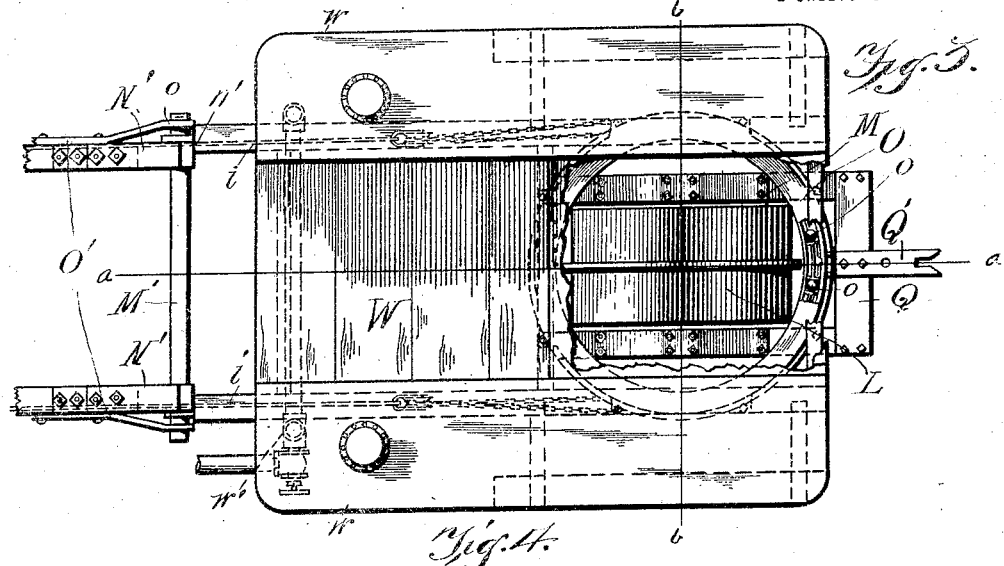
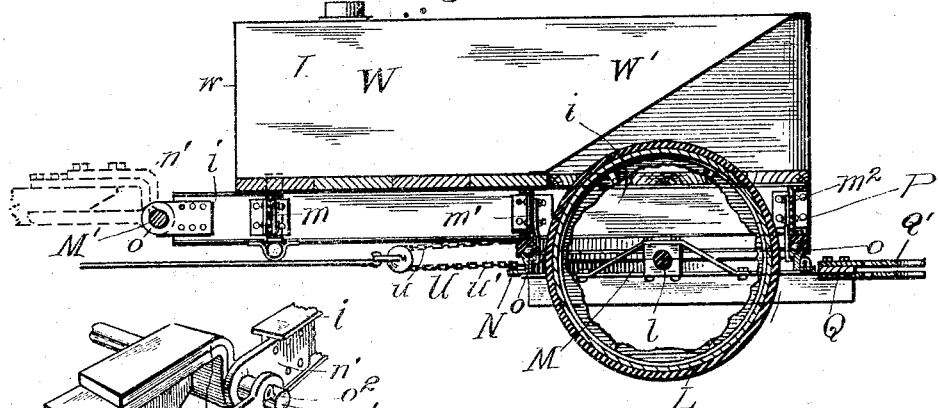
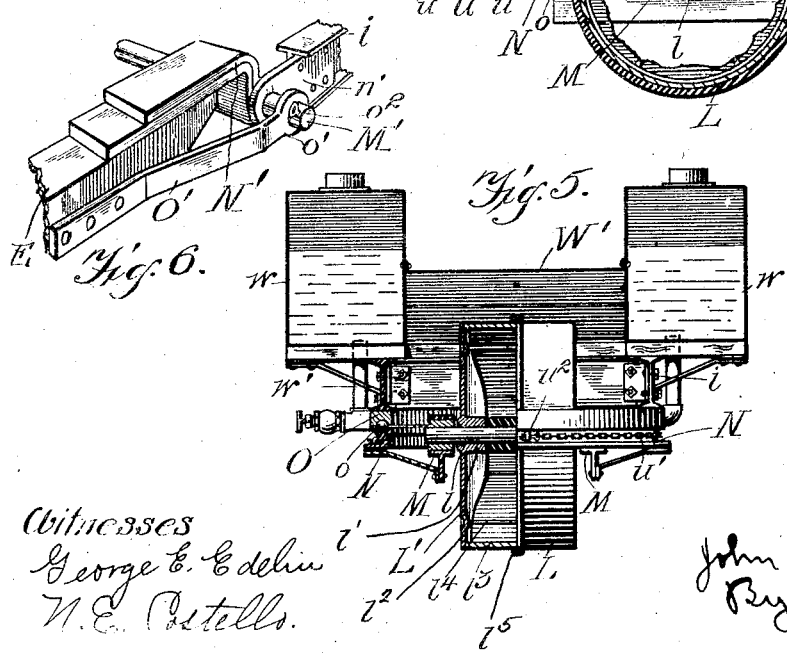

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

TRACTION-ENGINE.

1,156,203.   Specification of Letters Patent.   Patented Oct. 12, 1915.

Application filed August 7, 1907, Serial No. 387,540. Renewed March 19, 1915. Serial No. 15,574.

*To all whom it may concern:*

Be it known that I, JOHN B. BARTHOLOMEW, a citizen of the United States, residing at Peoria, in the county of Peoria and State of Illinois, have invented certain new and useful Improvements in Traction-Engines, of which the following is a specification, reference being had therein to the accompanying drawing.

The invention relates particularly to improvements in tender attachments for traction engines.

One of the objects of the invention is to provide such an attachment with an improved wheel support and steering devices.

A further object is to provide in connection with the wheel support of the tender improved coupler devices to which a trailing vehicle can be attached, the construction being such that the action of the draft on the coupler devices has a certain coöperative relation with the steering devices.

The nature of all of the various objects of the invention will be understood from the following detailed description in connection with the drawings.

Figure 1 is a side view showing, more or less conventionally, a traction engine and its tender. Fig. 2 is a plan view showing the frames and wheels for the engine and tender, the parts above the frames being removed. Fig. 3 is a plan view of the tender on a larger scale. Fig. 4 is a longitudinal sectional view of the tender on the line $a$—$a$, Fig. 3. Fig. 5 is a vertical cross section on the line $b$—$b$, Fig. 3. Fig. 6 is a perspective view showing the devices for connecting together the tender frame and the engine frame.

In the drawings, A indicates the boiler and the upper parts of a traction engine; B the cab; C, C the driving wheels; D, D the front steering wheels; E, E the main beams or longitudinal side sills of the engine frame.

F is a cylinder and engine parts; G the power transmitting gearing and shafting interposed between the engine shaft and the driving ground wheels C.

The front wheels D, D support the front part of the engine and are used in steering the apparatus. They are mounted upon an axle H which is connected to a yoke $h'$ that projects rearward and is flexibly connected to a nut $h^2$. This nut engages with the threaded shaft J mounted transversely in the longitudinal sills of the engine frame, or in brackets carried thereby. The nut $h^2$ is pivotally connected to a yoke or bar $j$ from which there extends rearward an arm K the rear end of which passes loosely through a guide $k$ and from which there extends forward an arm $k^3$ having sliding connection with the yoke $h'$. The threaded shaft J is rotated by the engineer through the instrumentality of a steering shaft extending from points near the cab B down toward the screw-shaft J and terminating in bevel gearing. By turning the screw-shaft J in one direction the nut $h^2$ is moved to the right or the left and that causes the steering wheels D to swing around on their vertical axis in corresponding directions.

I indicates, as a whole, the tender. It can be permanently connected to the engine or can be detachable therefrom when made in the way about to be described, and is provided with a single supporting wheel L. The longitudinal sills of this tender are shown at $i$, they being I-beams. They are connected by transverse bars or girts $m$, $m'$, $m^2$. The front ends of the beams $i$ are provided with bearing extensions $n'$ which are pivotally connected to the cross-hinge rod M′ which may be fastened permanently in place. But preferably it is detachable in strap bearings N′ secured to the rear ends of the engine sills E. It is capable of longitudinal movement through the bearings N′ $n'$. To prevent such movement accidentally, keeper bars O′ are employed, these being fastened to the outer sides of the engine beams E and having perforated ends $o$ encircling the ends of the hinge-rods M′.

$o^2$ are cotter keys or similar devices for preventing the disengagement of the parts.

Under the rear end of the tender a large, peculiarly constructed wheel is placed indicated at L. It is rigidly secured to the axle $l$ mounted transversely of the tender on the bars M, M carried by the curved bar or ring N. This ring is provided with the lower part of a race for the anti-friction balls $o$. The upper part O of the race for these balls is a ring counterpart to that at N and secured to the undersides of the sill beams $i$ and the cross-bars $m'$ $m^2$, of the tender frame. The two ring elements of the ball bearing are held in proper place relative to each other by means of the clamps or hook rods P. The bars M project somewhat to the rear of the ball bearing and of the tender frame and are connected by a cross-plate or bar Q to which is secured the rearwardly projecting coupler arm Q' adapted to have another vehicle, as a threshing machine or the like, secured thereto. The wheel L serves not only as the only support for the tender but also as one of the steering devices by which the whole apparatus can be turned in its course. It is turned on the vertical axis of the ball bearing as follows: R is a cross bar secured to the sill beams E, E, of the engine frame near their front ends. It supports horizontal pulleys $r$, $r$. S, S are chains connected to the bar K' of the front steering apparatus and passing around the pulleys or sheaves $r$. Each chain is connected to a draft rod or link T. At its rear end each of these rods is connected to a chain U, the strand $u$ of which is at its end rigidly secured to the tender frame, its other strand $u'$ extending backward and around one side of the ball bearing O. Each chain U is connected to its draft rod T by means of a pulley V. The power for turning the rear wheel L can be transmitted to it with great efficiency because of this manner of connecting the chains to the draft rods. The dimensions and positions of the various parts are so proportioned that the rear wheel L shall be turned on its vertical axis properly to attain the best results in steering as concerns the relations of this wheel to the forward steering wheels D D. This supporting and steering wheel L is constructed as a large hollow drum. It is built up of end plates L' each of which is formed with a central hub $l'$ and with flanges or wings $l^2$. The peripheral parts $l^3$ $l^3$ can be formed separately and the parts can be all secured together by a series of through bolts $l^4$. At the central transverse plane of the wheel, flanges are formed as shown at $l^5$. When the wheel is made in two half shells these flanges can be formed at the inner edges of the peripheral sections $l^3$. The drum however can be made with a single peripheral part, in which case the flanges would be of the nature of ribs projecting from the outer surface of the wheel. A wheel of this character furnishes a broad base of support for the tender so that the weight thereof can be sustained at the surface of the ground even though soft and tending to yield when pressed by a wheel of ordinary dimensions.

The tender is formed with a central open chamber or space W for receiving and retaining the solid fuel which is used in the fire-box of the engine. At the sides of this chamber or space W are the water tanks $w$—$w$. These are connected by a pipe or pipe sections $w'$ extending from the bottom of one tank to points below the tender frame and then across from side to side. Pipe $w'$ is connected by the flexible union at $w^2$ to the water pipes on the engine. At the end of the tender the chamber W terminates in an inclined wall W' which lies above the supporting and steering wheel L and is arranged to provide a clear space for the upper part of the wheel.

The tender frame, it will be seen, can be so constructed as to be exceedingly strong and can be firmly attached to the rear end of the engine frame. The two sets of uniting devices at M' N' and $n'$ being remote from each other a wide base of connection is provided and the tender frame is prevented from overturning. If the parts be constructed and related in the way shown and described the tender instead of increasing the resistance to, or difficulty in steering the advancing engine, when a load (such as a thresher and separator) is coupled behind the tender, reduces such resistance. The load helps the engineer to steer the engine and tender, as the load is almost always pulling back in a line which assists in turning the wheel L in the desired direction. For example, if the several vehicles coupled together are moving forward in a straight line, and it is desired to travel in a curve to the right, the engineer, by his steering shaft, throws the front steering wheels so that they will run in that direction, and thereupon two agencies come into play for correspondingly turning the tender; the first being the chains and links above described connecting the front steering gear with the frame of the rear wheel L, and the second being the resistance from the third vehicle (the thresher or the like). When the front steering wheels of the traction engine are turned thus to the right, the front end of the traction engine frame begins to move to the right about a central point located in the vertical plane of the axis of the rear supporting wheels C—C. Necessarily the rear end of the traction engine and the tender is swung to the left about this same center, and the third vehicle coupled to the frame of the wheel L holds the rear end of this wheel frame to the right, as the longitudinal lines of the traction engine are caused to assume an angle of inclination with respect to the longitudinal lines of the rear or third vehicle. The tender frame being as aforesaid secured to the engine frame on a long line or base of connection the tender will not have any lateral movement relative to the engine, and consequently, the frame of the rear wheel L is compelled to turn to a degree proportional to the extent of turning the front steering wheels.

What I claim is:

1. The combination with the traction engine, of the tender vehicle, the hinging devices between the tender and the engine adapted to hold the tender against movement across the longitudinal vertical planes of the engine but permit it to swing around a transverse line, the single ground wheel supporting the tender and situated in the central longitudinal vertical planes of the engine, substantially as set forth.

2. The combination with the traction engine, of the tender vehicle hinged on a transverse line to the engine and held against transverse movement relative to the engine, the single supporting and steering wheel below the tender in the central longitudinal plane thereof, the horizontally swinging frame for said wheel, the antifriction bearing between the said swinging frame and the tender, and means controlled by the engineer while on the engine for turning the frame, substantially as set forth.

3. The combination of the engine, the tender hinged to the engine on a transverse line and held against movement relative to the engine in transverse planes, the supporting and steering wheel under the tender situated in the central, longitudinal, vertical planes of the tender and engine, said wheel being constructed with a wide peripheral wall or tire and adapted to be turned around a vertical axis, and means controlled by the engineer while on the engine for turning the said wheel around said vertical axis, substantially as set forth.

4. The combination of the traction engine having steerable front wheels, the tender hinged to the engine on a transverse axis and held against movement in transverse planes relative to the engine, the supporting wheel beneath the tender mounted to turn around a vertical axis, and a coupler for a rear vehicle arranged to turn with the said wheel relatively to the tender, substantially as set forth.

5. The combination with the traction engine having steerable front wheels, of the tender hinged to the engine on a transverse line and held against movement in transverse planes relative to the engine, the supporting and steering wheel beneath the tender, the frame for said wheel adapted to swing in a horizontal plane relative to the tender, and a coupler for a rear vehicle carried by the swinging frame, substantially as set forth.

6. The combination of the engine having steerable front wheels, the tender hinged to the engine on a transverse axis and held against movement in transverse planes relative to the engine, the supporting and steering wheel beneath the tender, the means actuated by the engineer for turning the said wheel on a vertical axis, and the coupling device for a rear vehicle adapted to turn with the said wheel, substantially as set forth.

7. The combination of the traction engine, the supporting and steering wheels therefor, the tender hinged to the engine, the supporting and steering wheel for the tender, means connecting the steering wheels of the engine to the steering wheel of the tender, and the laterally movable coupler for the rear vehicle adapted to turn with the steering wheel of the tender, substantially as set forth.

8. The combination of the traction engine, the supporting and steering wheels therefor, the coupler for a rear vehicle, connections between the coupler and the engine frame comprising pivotal devices arranged to permit angular movement of the coupler in a horizontal plane with respect to the engine, and power transmitting devices connecting said coupler to the steering wheels of the engine, whereby the coupler is turned laterally in relation to the longitudinal lines of the engine in directions corresponding to the directions of the movement of the steering wheels, substantially as set forth.

9. The combination of the traction engine, the supporting and steering wheels therefor, the tender hinged to the engine, the single supporting wheel for the tender adapted to turn laterally in steering, the power transmitting devices connected to the steering wheels of the engine and adapted to turn the wheel beneath the tender, and the coupler for a rear vehicle connected to the said power-transmitting devices, whereby the coupler can swing laterally in directions corresponding to the directions of the movement of the engine steering wheel, substantially as set forth.

10. The combination of the engine, the tender secured to the engine in a manner to prevent lateral swinging of the tender relative to the engine, a supporting truck for the tender pivotally secured thereto on a vertical axis and having a single supporting wheel disposed in the central longitudinal plane of the tender, substantially as set forth.

11. The combination of the engine, the tender secured to the engine in a manner to prevent lateral swinging of the tender relative to the engine, a swinging wheel truck for supporting the tender pivotally secured thereto on a vertical axis, and a coupler movable with the swinging truck for securing a rear vehicle to the tender, substantially as set forth.

12. The combination of the engine having supporting and steering wheels, the tender secured to the engine in a manner to prevent lateral swinging of the tender relative to the engine, a swinging wheel truck for supporting the tender pivotally secured thereto on a vertical axis, a coupler movable with the swinging truck for securing a rear vehicle to the tender, and means interposed between the steering wheels of the engine and the said truck for swinging the latter about its pivotal axis in directions corresponding to the directions of the movement of the engine steering wheels.

In testimony whereof I affix my signature, in presence of two witnesses.

JOHN B. BARTHOLOMEW.

Witnesses:
G. W. PERRY, Jr.,
A. L. GREGORY.